United States Patent [19]

Föller

[11] Patent Number: 4,475,569

[45] Date of Patent: Oct. 9, 1984

[54] FLOAT CONTROLLED CONDENSATE DISCHARGE DEVICE

[75] Inventor: Werner Föller, Stuhr, Fed. Rep. of Germany

[73] Assignee: Gestra Kondensatableiter GmbH & Co. KG, Bremen, Fed. Rep. of Germany

[21] Appl. No.: 485,876

[22] Filed: Apr. 18, 1983

[30] Foreign Application Priority Data

Apr. 24, 1982 [DE] Fed. Rep. of Germany ....... 3215459

[51] Int. Cl.³ .............................................. F17T 1/20
[52] U.S. Cl. .................................................. 137/194
[58] Field of Search ........................ 137/194, 192, 185

[56] References Cited

U.S. PATENT DOCUMENTS 2,074,706  3/1937  Ramdow ............................. 137/194

*Primary Examiner*—Alan Cohan
*Attorney, Agent, or Firm*—Collard, Roe & Galgano

[57] ABSTRACT

A condensate discharge device includes a housing formed with a flow chamber, and inlet and outlet pressure regions. A valve seat is disposed in the inlet region, and a closure part cooperates with the valve seat, so as to be able to rest thereon. A closed float is disposed in the flow chamber, and is movable along a stroke distance, and a lever mechanism connects the float with the closure part, and has a force transmission ratio proportional to the stroke distance. The improvement includes the flow chamber operating as a condensate throughput chamber, with the float dividing the flow chamber into upper and lower zones. Additionally, a throttle aperture is formed between the periphery of the float and a wall which at least partially defines the flow chamber, which aperture communicates with the zones; the flow chamber formed upstream of the throttle aperture is provided with an inflow opening, and the valve seat and the closure part are disposed in the flow chamber downstream of that throttle aperture so when the condensate fills the flow chamber to a predetermined level, the float will move within the flow chamber and raise the closing element off said valve seat to permit the condensate to be drained through the throttle aperture into the outlet region.

11 Claims, 4 Drawing Figures

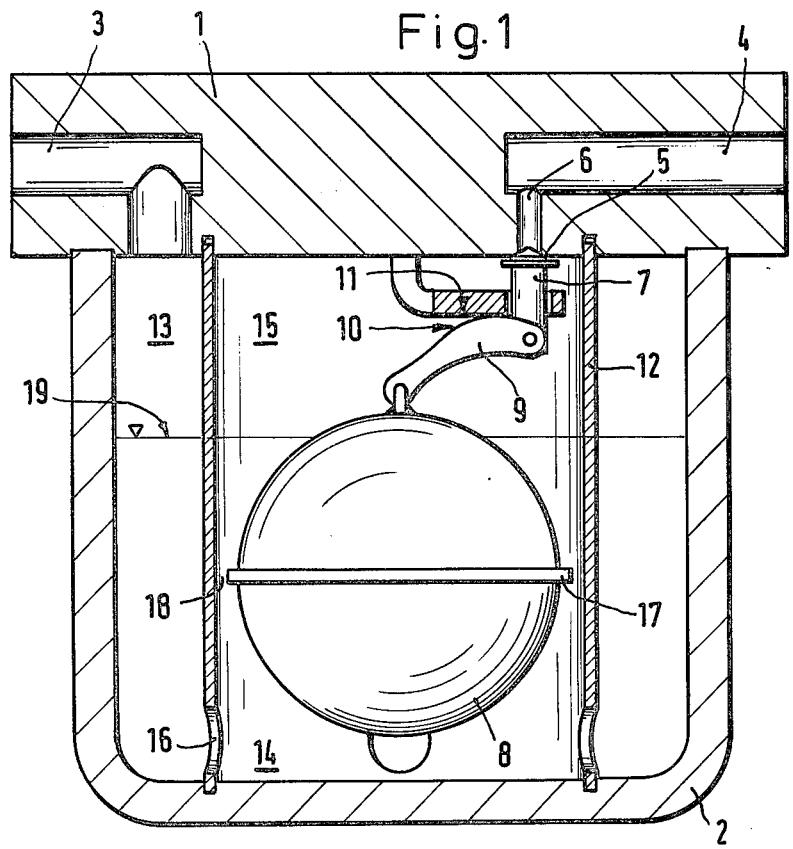
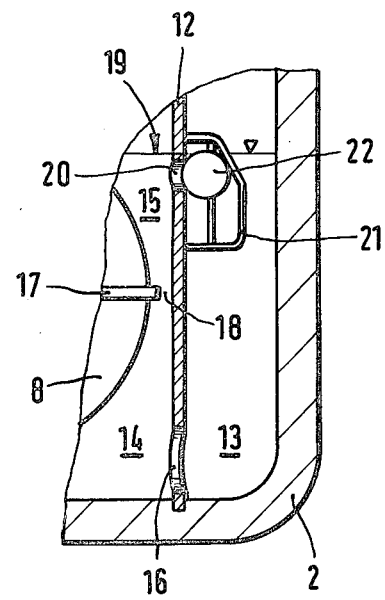

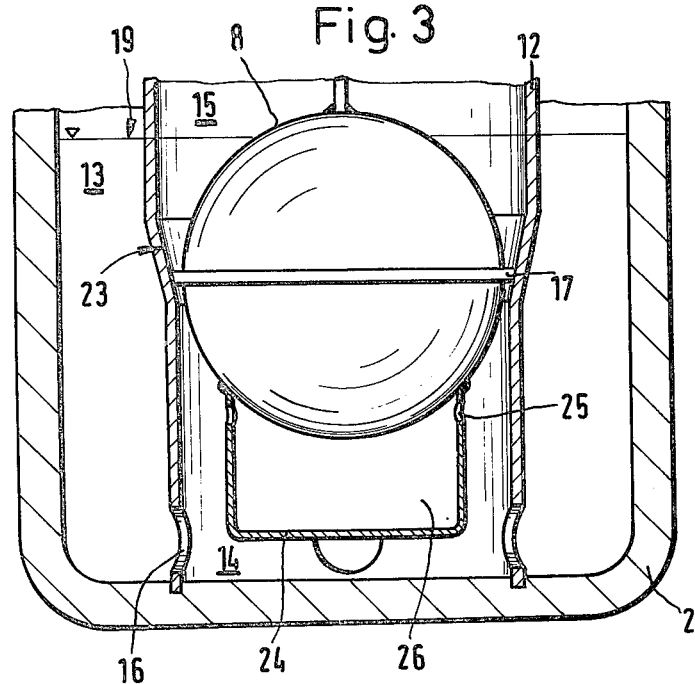
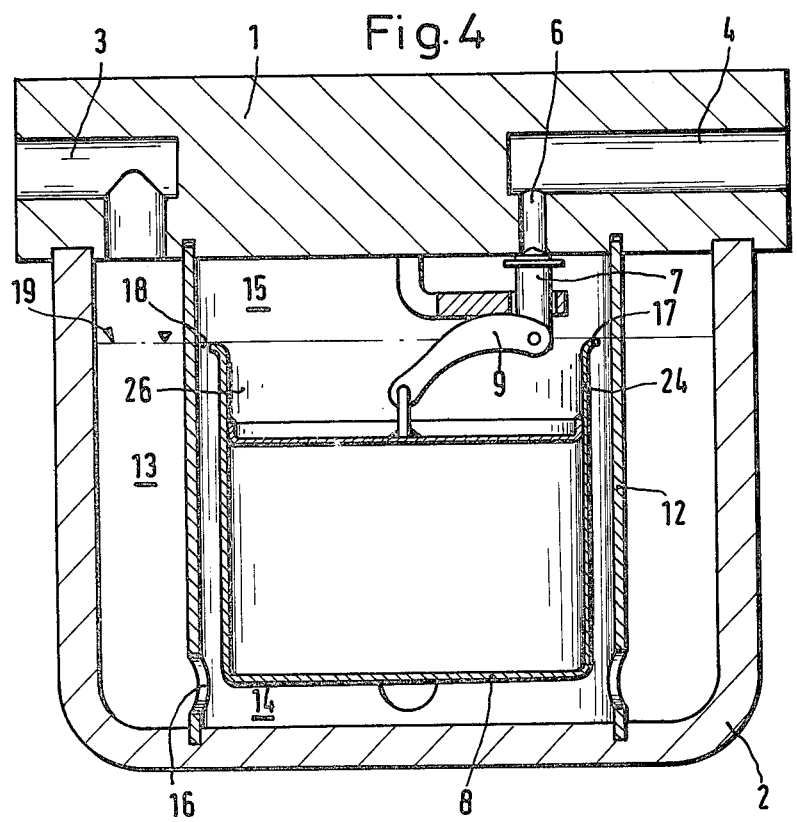

FLOAT CONTROLLED CONDENSATE DISCHARGE DEVICE

BACKGROUND OF THE INVENTION

1. Field of the Invention

The invention relates to a condensate discharge device including a housing formed with a flow chamber, which has inlet and outlet pressure regions, a valve seat disposed in the inlet pressure region, a closure part cooperating with the valve seat so as to be able to rest thereon, a float disposed in the chamber and movable along a stroke distance, and lever means connecting the float with the closure part, and having a force transmission ratio in dependence of the stroke distance.

2. Description of the Prior Art

Condensate discharge devices controlled by a float make use of the density difference between the condensate and the vapor. A buoyant force generated by the condensate and acting on the float is transmitted through a lever mechanism to a closure part. The closure part is either opened or closed by the vapor forces acting thereon. Since the buoyant force is relatively small, condensate discharge devices controlled by a float are relatively large compared to other condensate discharge devices. Several devices have become known, where, by taking appropriate measures with respect to the closure part, an attempt has been made to reduce the magnitude of the prevailing pressure forces, when the valve begins to open so as to require only a small buoyant force, and hence a small dimension of the device. All of these attempts have failed, particularly in the case of condensate discharge devices having small or medium flow throughputs, as the measures to be taken pertaining to the closure part required a very difficult control of the valve openings. Moreover, the valve openings of these conventional devices are easily clogged in actual operation, even when a small amount of contamination occurs.

When the force acting on the closure part is varied, on one hand, with an increasing pressure difference, while the buoyant force is held almost constant, almost all conventional float controlled condensate discharge devices make use of differently sized closure parts, in order to be able to more efficiently use the available condensate discharge housing over a greater pressure range. In a known device, this disadvantage is somewhat compensated for by the varying the transmission ratio or leverage of the transmission mechanism along the stroke of the float. As the valve begins to open, a relatively large leverage force provided by the transmission mechanism ensures that the closure part will open at a large pressure difference with a relatively small stroke. During the opening stroke, the transmission ratio decreases so that if the pressure difference become smaller, there is a further opening of the valve closure part. Thus, an almost constant throughput can be obtained over the operating pressure of the device. But this construction does not reduce the size of the condensate discharge device.

SUMMARY OF THE INVENTION

It is accordingly a principal object of the present invention to provide a condensate discharge device of the above-described type, which is reduced in size so as to obviate the aforementioned disadvantages.

This object is attained in a condensate discharge device which includes a housing formed with a flow chamber, and having inlet and outlet pressure openings, a valve seat disposed in the inlet pressure region, a closure part cooperating with the valve seat so as to be able to rest thereon, a float disposed in the chamber and movable along a stroke distance, and a lever mechanism connecting the float with the closure part, and having a force transmission ratio which is proportional to the stroke distance. The flow chamber operates as a condensate throughput chamber, with the float dividing the chamber into upper and lower zones. A throttle aperture communicating with each of the zones is formed between the periphery of the float and a wall at least partly defining the flow chamber. The flow chamber has an inflow opening for the condensate to be discharged formed upstream of the throttle aperture, and the valve seat and closure part are disposed in the flow chamber downstream of that throttle aperture.

The condensate to be discharged flows through the throttle region in the throughput chamber of the condensate discharge device according to the present invention. As soon as the float, due to the initial large force transmission ratio, has lifted the closure part somewhat from the valve seat, so that flow of the condensate is initiated, the pressure then drops in the upper zone disposed above the float, with respect to the lower zone. This in turn results in an increase of the opening force available from the float. In order to further open the closure part, the force due to the transmission ratio can therefore be reduced, and hence the stroke of the float can be considerably diminished. Due to the smaller stroke of the float and/or due to a smaller float, the size of the condensate discharge device can be considerably reduced. Furthermore, there results an efficient further opening of the closure part, and an efficient corresponding closure of the condensate discharge device.

It is particularly advantageous if the flow chamber is disposed below the inlet and the outlet of the condensate discharge device, with the inlet and the outlet having a common axis. Preferably, the housing is additionally formed with an antechamber communicating with the inlet and the inflow opening.

By providing a ventilation opening formed in the wall which communicates with the antechamber and the upper zone, inert gases, for example, air, passing from the antechamber through the ventilation opening into the upper zone, can be easily discharged therefrom. This may be accomplished by shut-off means controlled by the float, or, as is already known, by additional ventilation devices which may, for example, be thermally controlled. The ventilation opening is dimensioned in relation to the throttle aperture so that it does not substantially influence any drop in pressure in the upper zone of the chamber.

It is further advantageous if a float-actuated control valve is provided which cooperates with the ventilation opening, and if the float is designed to commence opening of the closure part when the condensate reaches a certain level in the flow chamber, and wherein the ventilation opening is disposed below this certain level. With this construction, the ventilation opening is closed when the condensate is then discharged. Even if the ventilation opening has a large diameter, any pressure drop is not influenced thereby.

It is further advantageous if the wall of the condensate discharge device includes a conically upwardly flaring or diverging seat portion, and if the float is designed to be seated on the seat portion, when the closure portion rests on the valve seat. By means of this construction, the cross-section of the throttle aperture in the chamber is reduced to a negligible amount or zero in the closed position of the closure part. During the opening stroke of the float, the cross-section of the throttle aperture is increased. The course of the opening and closing process can thereby be positively influenced.

It is further advantageous if a weight is attached to the float which has a density equal to, or at least substantially corresponds to the density of the condensate to be discharged. By this construction the weight attached to the float does not appreciably influence the effective buoyant force, if it is circumcirculated by the condensate during the opening process. If, however, during a lower condensate level, vapor bubbles pass into the chamber, then, in view of the density of the weight selected, this weight is added to the closure force of the float. Thus, there results an acceleration of the closure movement and thus a rapid closing of the condensate discharge device.

It is particularly advantageous if the weight includes a basin filled with condensate, and if the basin is formed with at least one hole near an upper part thereof communicating with the chamber. By disposing the weight on, and above the float, the level of the condensate in the chamber may be increased prior to the opening process practically up to an upper edge of the weight.

Other objects and features of the present invention will become apparent from the following detailed description, considered in connection with the accompanying drawings which disclose the embodiments of the invention. It is to be understood, however, that the drawings are designed for the purpose of illustration only and not as a definition of the limits of the invention.

BRIEF DESCRIPTION OF THE DRAWINGS

In the drawings, wherein similar reference characters denote similar elements throughout the several views:

FIG. 1 is a cross-sectional view, partly in elevation, of a first embodiment of the condensate discharge device, according to the present invention;

FIG. 2 is a cross-sectional view, partly in elevation, of a detail of a modification of the condensate discharge device shown in FIG. 1;

FIG. 3 is a cross-sectional view, partly in elevation, of a second embodiment of the condensate discharge device according to the invention; and FIG. 4 is a cross-sectional view, partly in elevation, of a third embodiment of the condensate discharge device according to the invention.

DESCRIPTION OF THE PREFERRED EMBODIMENTS

The condensate discharge device shown in FIG. 1 includes a discharge housing consisting of an upper housing part 1, and a lower housing part 2. Upper housing part 1 is formed with an inlet 3, as well as an outlet 4. Upper housing part 1 includes a valve seat 5 formed within, and a discharge bore 6 which communicates seat 5 with outlet 4 and chamber 15. A closure part or valve stem 7 is provided with a valve seal on one end for closing and sealing valve seat 5. The other end of stem 7 is coupled to a force transmission mechanism 9 and 11 which, in turn, is responsive to a ball float 8 disposed in lower housing part 2. Force transmission mechanism 9 and 11 include a pivotably disposed driving lever or rocker arm 9 having float 8 coupled to one end thereof. The other end of arm 9 is coupled to valve stem 7. Rocker arm 9 includes a cam surface 10 which, during movement, rolls on a fixed abutment surface 11, so that the effective force transmission ratio or leverage between float 8 and stem 7 changes during a stroke. When valve stem 7 is closed, a large transmission force ratio with a high opening force and a low rate of stroke movement prevails. In the open position, this force ratio changes to a low opening force with a high stroke movement rate.

The interior of the housing is divided to form an inlet pressure region by an upright tubular cylinder 12. Cylinder 12 defines two concentric zones or chambers, namely chamber 13 on the one hand, and chambers 14 and 15 on the other hand. Zone 13 forms an exterior chamber, which communicates with the inlet 3 disposed thereabove, and with inflow openings 16. Inflow openings 16 are formed in tubular cylinder 12 and communicate with the flow throughput central chamber 14, 15. Chamber 14, 15 is subdivided by float 8 disposed therein into an upper chamber 15 and a lower chamber 14. This partition is obtained by a throttle ring 17 surrounding float 8. Between throttle ring 17 and tubular cylinder 12 there is defined an annular throttle aperture 18. Upper chamber 15 communicates with lower chamber 14 through ring 17. In upper chamber 15 there is disposed valve seat 5, valve stem 7, as well as force transmission mechanism 9, 11.

The path of the condensate to be discharged passes from inlet chamber 3 into exterior chamber 13, then downwardly into inflow openings 16 and into lower chamber 14. The condensate then passes through throttle opening 18 into upper chamber 15. It finally flows therefrom through discharge bore 6 into outlet 4.

During inflow of the condensate, exterior chamber 13 and chambers 14 and 15 are filled uniformly. If level 19 is reached, then float 8 will lift valve stem 7 from valve seat 5 through the then prevailing high force transmission ratio of transmission mechanism 9, 11. As discharge bore 6 begins to open, there is a pressure drop in upper chamber 15 above float 8 which, although minimal, causes the condensate level in exterior chamber 13 to fall, and simultaneously causing an increase in the condensate level in upper chamber 15. As a result, float 8 is lifted, and valve stem 7 is thereby further opened. The condensate now being discharged causes a pressure difference across throttle opening 18, which acts on the cross-section of float 8 and its throttling ring 17. Thus, a force additionally acting on float 8 is added to its force of buoyancy, so that float 8 is efficiently opened further, in spite of the now gradually reducing force transmission ratio acting thereon. Therefore it is possible to attain a large closure stroke with a particularly small-sized float 8, or alternately a relatively small float stroke.

If the condensate level drops further in exterior chamber 13 to an extent that it reaches the level of flow openings 16, then gases from exterior chamber 13 penetrates into lower chamber 14. This reduces the buoyancy of float 8. Float 8 only permits a small closure movement of the valve stem 7, so that the pressure in upper chamber 15 above float 8 is increased which, in turn, reduces the pressure difference across throttle opening 18. This also lowers the previously described additional force exerted on float 8. Consequently, float 8 moves further in the direction of closure, while the additional force acting thereon is further decreased. The closure process therefore continues efficiently until the valve stem 7 closes valve seat 5. This reliably prevents any vapor losses.

In the modification according to FIG. 2, tubular cylinder 12 is formed with a ventilation opening 20 which connects exterior chamber 13 with upper chamber 15 below the level of condensate 19. A float sphere 22 disposed in exterior chamber 13 within a guide cage 21, controls ventilation opening 20.

When the level of the condensate is low, float sphere 22 lies in a lower part of guide cage 21, and uncovers ventilation opening 20. Then any gases entering exterior chamber 13 which are not condensed, such as, for example, air, can pass largely unhindered into upper chamber 15. The gases pass therefrom either at the start of the opening phase to discharge opening 6, or, as is already known, may pass through, for example, a thermostatically controlled ventilator.

When the level of the condensate in the chambers 13, 14 and 15 rises, then float sphere 22 also rises, and closes ventilation opening 20. The opening process of valve stem 7 is then accomplished as described in relation to FIG. 1. If the level of the condensate in exterior chamber 13 falls below level 19, then float sphere 22 falls downwardly away from the level of ventilation opening 20. Consequently, the pressure in upper chamber 15 above float 8 rises. Any pressure difference existing across throttle aperture 18 is therefore reduced, and the initial force of float 8 is also reduced. The closure process described with the aid of FIG. 1 then takes place, only at an increased level of the condensate.

In the alternate embodiment accordng to FIG. 3, tubular cylinder 12 is formed with a downwardly-tapering frustoconical zone 23. Its lower portion forms a valve seat onto which throttle ring 17 of ball float 8 abuts sealingly in the closure position of valve stem 7. In this case, throttle aperture 18 has therefore been reduced to zero. When float 8 rises, throttle aperture 18 becomes effective again; its cross-section increases steadily, as float 8 rises within frustoconical zone 23, so that at the moment of opening, a very high additional opening force arises. However, when valve stem 7 opens, this force is not sufficiently large so as to endanger the start of the closure process.

Below float 8, there hangs a thin-walled basin 24 of low weight. Basin 24 is formed on its upper end with lateral openings 25, through which condensate from lower chamber 14 passes, and fills interior 26 of basin 24.

During the opening process, when basin 24 is surrounded by the condensate, the weight of float 8 is merely increased by the weight of basin 24 itself. Thus, in view of the density of the condensate being identical within and outside of basin 24, the filling of basin 24 with condensate does not influence the opening process. The filling process proceeds as has been described with the aid of FIG. 1.

If, as a result of a lowered level of the condensate in exterior chamber 13, vapor bubbles pass through inflow openings 16 into chambers 14 and 15, then the buoyancy of float 8 is reduced. The condensate filling basin 24 thus adds to the closure force of float 8. The closure movements of float 8 and of valve stem 7 are thereby substantially accelerated, and any vapor lost is quickly prevented.

In the further embodiment according to FIG. 4, basin 24 is disposed on top of float 8. Basin 24, which is open on top, and is formed by a high rim of float 8, remains filled with the condensate following the first condensate slucing process. If vapor is present in chambers 14 and 15, then the weight of float 8 and that of basin 24 are summed. When the chamber fills with condensate, its level will rise until the weight of the basin is compensated. The opening process therefore will start only after a higher level of condensate 19 has been reached.

A solid body having the same density as the condensate can also be used in lieu of basin 24 in FIG. 4.

Instead of the peripheral throttle ring 17 being disposed on float 8, there can also be provided a disc-type piston 117, whose periphery together with cylindrical wall 12 of chambers 14 and 15 define throttle aperture 18. Within the scope of the invention it is, however, possible to dispense with the use of a separate throttle element. The periphery of float 8 then forms the inner border surface of throttle aperture 18.

While several embodiments of the present invention have been shown and described, it will be obvious that many modifications and changes may be made therein without departing from the spirit and scope of the invention.

What is claimed is:

1. A float controllable condensate discharge device responsive to a level of condensate comprising;

a housing having an input supply opening, a discharge opening, and a walled flow chamber communicative with said input supply opening and said discharge opening;

a valve seat defining the opening of said discharge opening within said flow chamber;

a closure element cooperating with said valve seat and movable between an opened and closed position relative thereto, wherein in the closed position, said element rests on said valve seat in sealing relationship, a float disposed in said flow chamber and movable along a stroke distance within said chamber, lever means coupling said float with said closure element and having a force transmission ratio applied to said closing element that is proportional to the stroke distance of said float, said chamber operating as a condensate throughput chamber with said float dividing said flow chamber into upper and lower zones and defining therebetween, a throttle aperture communicating with said zones and formed along the periphery of said float, and the wall of said flow chamber;

said flow chamber having inflow opening means communicative with the inlet opening for receiving the condensate to be discharged, said inflow opening means being formed upstream of said throttle aperture, said valve seat and said closure element being disposed in said interior chamber downstream of said throttle aperture so when the condensate fills said flow chamber to a predetermined level, said float will move downstream into the upper zone of said flow chamber and raise said closing element off said valve seat to permit the condensate to be drained through said throttle aperture into the discharge opening of said housing.

2. The condensate discharge device as claimed in claim 1, wherein said flow chamber is disposed below said inlet and said outlet formed in said housing, said housing being additionally formed with an exterior chamber communicating with said inlet opening and said inflow opening means.

3. The condensate discharge device as claimed in claim 2, further comprising a ventilation opening formed in said flow chamber wall and communicating with said external chamber and with said upper zone.

4. The condensate discharge device as claimed in claim 3, further comprising a float-actuated control valve cooperating with said ventilation opening, said float opening said closure element upon said condensate reaching a certain level in said flow chamber, said ventilation opening being disposed below said certain level.

5. The condensate discharge device as claimed in claim 1, wherein the wall of said flow chamber includes a conically upwardly diverging seat portion, said float being disposed on said diverging seat portion when said closure element rests on said valve seat.

6. The condensate discharge device as claimed in claim 1, further comprising a weight attached to said float having a density substantially corresponding to the density of the condensate to be discharged.

7. The condensate discharge device as claimed in claim 6, wherein said weight includes a basin for receiving condensate, said basin being formed with at least one hole near an upper part thereof communicating with said flow chamber.

8. The condensate discharge device as claimed in claim 6, wherein said weight is disposed on, and above said float.

9. The condensate discharge device as claimed in claim 1, further comprising a throttle ring surrounding said float, said throttle aperture being formed between the periphery of said throttle ring and said wall.

10. The condensate discharge device as claimed in claim 5, further comprising a throttle ring surrounding said float, said throttle aperture being formed between the periphery of said throttle ring and said wall, and wherein said wall includes a conically upwardly diverging seat portion, said throttle ring being arranged to be seated on said seat portion when said closure part rests on said valve seat.

11. A float controllable condensate discharge device responsive to a level of condensate comprising;
  a housing having an input supply opening, a discharge opening, and a flow chamber communicative with said input supply opening;
  a walled interior chamber formed within said flow chamber;
  a valve seat defining the opening of said discharge opening within said interior chamber;
  a closure element cooperating with said valve seat and movable between an opened and closed position relative thereto, wherein in the closed position, said element rests on said valve seat in sealing relationship,
  a float disposed in said internal flow chamber and movable along a stroke distance within said interior chamber,
  lever means coupling said float with said closure element and having a force transmission ratio applied to said closing element that is proportional to the stroke distance of said float, said interior chamber operating as a condensate throughput chamber with said float dividing said interior chamber into upper and lower zones and defining therebetween, a throttle aperture communicating with said zones and formed along the periphery of said float, and the wall of said interior chamber;
  said interior chamber having inflow opening means communicative with the inlet opening in said flow chamber for receiving the condensate to be discharged, said inflow opening means being formed upstream of said throttle aperture, said valve seat and said closure element being disposed in said interior chamber downstream of said throttle aperture so when the condensate fills said interior chamber to a predetermined level, said float will move downstream into the upper zone of said interior chamber and raise said closing element off said valve seat to permit the condensate to be drained through said throttle aperture into the discharge opening of said housing.

* * * * *